United States Patent
Hecking

(10) Patent No.: US 8,800,495 B2
(45) Date of Patent: Aug. 12, 2014

(54) CORNCOB BASED ANIMAL LITTERS

(75) Inventor: Robert J. Hecking, Cincinnati, OH (US)

(73) Assignee: TJM Innovations, LLC, Milwaukee, WI (US)

( * ) Notice: Subject to any disclaimer, the term of this patent is extended or adjusted under 35 U.S.C. 154(b) by 70 days.

(21) Appl. No.: 13/562,971

(22) Filed: Jul. 31, 2012

(65) Prior Publication Data

US 2013/0220227 A1 Aug. 29, 2013

Related U.S. Application Data

(60) Provisional application No. 61/604,749, filed on Feb. 29, 2012.

(51) Int. Cl.
*A01K 29/00* (2006.01)

(52) U.S. Cl.
USPC ............................................. 119/171

(58) Field of Classification Search
USPC .................................. 119/171, 165
See application file for complete search history.

(56) References Cited

U.S. PATENT DOCUMENTS

| | | | | | |
|---|---|---|---|---|---|
| 4,296,709 | A | * | 10/1981 | Schulein, Jr. | 119/171 |
| 4,851,214 | A | * | 7/1989 | Walters et al. | 424/65 |
| 5,005,520 | A | * | 4/1991 | Michael | 119/172 |
| 5,016,568 | A | | 5/1991 | Stanislowski et al. | |
| 5,091,245 | A | * | 2/1992 | Phillips | 428/221 |
| 5,189,987 | A | | 3/1993 | Stanislowski et al. | |
| 5,901,661 | A | | 5/1999 | Pattengill et al. | |
| 6,053,125 | A | * | 4/2000 | Kory et al. | 119/171 |
| 6,635,344 | B1 | * | 10/2003 | de Almeida et al. | 428/326 |
| 6,664,254 | B1 | * | 12/2003 | Rogozinski | 514/231.2 |
| 2005/0132968 | A1 | * | 6/2005 | Swank | 119/171 |
| 2006/0269509 | A1 | * | 11/2006 | Gumbrecht et al. | 424/76.2 |
| 2008/0087226 | A1 | * | 4/2008 | Steckel et al. | 119/173 |
| 2013/0112150 | A1 | * | 5/2013 | Ellis et al. | 119/172 |

* cited by examiner

*Primary Examiner* — Andrea Valenti
(74) *Attorney, Agent, or Firm* — Quarles & Brady LLP

(57) ABSTRACT

Cat litter is formed from ground corncob granules, a clumping agent such as guar gum, and an odor control agent such as soyaethyl morpholinium ethosulfate. A water solution of the odor control agent is sprayed onto corncob granules. Thereafter, the clumping agent is slowly mixed in (without forming clumps), and excess water is evaporated off. The odor control agent is applied in a substantially uniform and adherent manner, without materially comprising absorbency or causing significant premature clumping.

1 Claim, No Drawings

CORNCOB BASED ANIMAL LITTERS

CROSS-REFERENCE TO RELATED APPLICATION

This application claims priority based on U.S. provisional application 61/604,749 which was filed on Feb. 29, 2012.

STATEMENT OF FEDERALLY SPONSORED RESEARCH OR DEVELOPMENT

Not applicable.

BACKGROUND OF THE INVENTION

The present invention relates to animal litters. More particularly it relates to clumpable cat litters which are environmentally friendly, moisture absorbent and odor retaining.

Cat litter boxes are typically provided with an absorbent material that collects pet urine and feces. House pets are trained to leave their waste in these boxes, and periodically the pet owner throws away and replaces used litter.

Clay is often used as a litter box absorbent material. However, obtaining clay can be environmentally destructive, and in any event some clays contain materials that cause health concerns and/or clog household plumbing. Thus, ingredients such as ground corncob have been proposed as the absorbent material for cat litter.

Regardless of the nature of the absorbent material, a particularly desirable form of cat litter includes one or more ingredients that cause the litter to clump around wetted litter, permitting the used portion of the litter to be removed with a rake while the unused litter remains in the litter box. This helps reduce the incidence of mold growing in the litter box, reduces malodors associated with litter boxes, and avoids waste of unused absorbent material. For example, U.S. Pat. No. 6,053,125 teaches the use of ground corncob for kitty litter with guar gum as an additive to provide clumping capability.

However, there is still a need to address odor control. A variety of odor control materials have therefore been proposed to be added to cat litters. These range from masking fragrances to chemicals that suppress the vapor pressure of malodors. See e.g. U.S. Pat. Nos. 4,851,214, 5,016,568, 5,189,987 and 5,901,661. However, to achieve optimal adhering and uniformity (and thus effectiveness) of these odor control materials, applying them to the base material in liquid form is desirable. Unfortunately, applying liquids to a clumpable litter can cause premature clumping and/or adversely affect residual absorbency.

In a variety of contexts (e.g. fragrance applied to powdered detergent) liquids are applied to powders in a spraying process without significant clumping occurring. However, these formulations are not particularly designed to clump extremely easily in the presence of liquid.

Hence, a need exists for improved clumpable litters having odor control capability.

SUMMARY OF THE INVENTION

The present invention provides animal litters that have corncob particles, a clumping agent, and an odor control agent. A water solution of odor control agent is applied onto the corncob particles, and thereafter at least some of the water is permitted to evaporate from the corncob particles prior to an animal using the litter to dispose of waste. Most preferably one sprays the solution into a ribbon blender while it is mixing the corncob particles.

In one aspect the litter has at least 85% corncob granules, at least 0.1% of a clumping agent (e.g. guar gum or starch), and at least 0.1% of an odor control agent (e.g. as per U.S. Pat. No. 4,851,214). A small amount of a fragrance such as lavender can also (or instead) be added, albeit fragrance is often more preferred by humans than by the cats.

Another form of the invention relates to methods for forming such litters. Preferred methods involve obtaining a water solution of the odor control agent, then spraying the water solution onto corncob particles (while essentially avoiding clumping), then mixing in the clumping agent. Surprisingly this creates a moist litter without significant clumping. One then permits at least some water content in the moist litter to evaporate from the moist litter (while still leaving odor control agent adhering to corncob particles, but in a more dry litter).

It has been discovered that if the water solution is applied to (most preferably sprayed on) the corncob granules prior to adding the clumping agent, the later addition of the clumping agent can be achieved without experiencing significant premature clumping. The resulting moist litter can then be sufficiently dried to reestablish desired absorbency, while still leaving sufficient amounts of odor control agent adhering to the granules.

The resulting product is environmentally friendly for a number of reasons. First, it uses what otherwise might sometimes be a waste material for a desirable purpose. Further, grinding corncobs to prepare the particles leaves only a minimal environmental footprint. Further, the corncob material is biodegradable and acceptable for use near humans and small mammals.

Moreover, the litter can be formed with desirable absorbency, clumping, and odor control properties. This is achieved at low cost.

These and still other advantages of the present invention will become more apparent, and the invention will be better understood, by reference to the following description of preferred embodiments of the present invention.

DETAILED DESCRIPTION OF THE PREFERRED EMBODIMENT

I describe herein animal litters (especially litters intended for use with house cats) which preferably comprise more than 85% ground corncob, with a clumping agent such as guar gum, and the remainder (apart from trace moisture) of a deodorizer and/or fragrance that has been sprayed onto the corncob material as part of a water solution. Also, described herein are methods for applying the deodorizer/fragrance in liquid form without causing significant clumping concerns, and steps to reduce the liquid content of the resulting moist litter prior to use.

For example, a relatively concentrated water solution of soyaethyl morpholineum ethosulfate deodorizer can be prepared (e.g. two parts water to one part deodorizer). Ground corncob can be placed into a ribbon blender and then sprayed with the deodorizer/water mixture while the corncob is being turned over and over in the ribbon blender. This should be done at a slow enough spraying rate, and a fast enough blender rate, to keep clumps from forming in the mixture. Then, while the ribbon blender was still turning the mixture, the clumping agent can be added in small increments. Surprising, this can be done without causing significant clumping (even though adding water to such a mixture with the clumping agent causes such clumping).

Adding the odor control agent in a water solution helps distribute the odor control agent more uniformly, as well as helps adhere it to the corncob material in a manner which resist evaporation. However, this also reduces the absorbency of the resulting litter somewhat (as compared to applying the odor control agent without water). Thus, it is preferred to reduce the water content of the resulting moist litter by a drying step.

One way to do this is to continue ribbon blending with the blender open to the air so that moisture can evaporate. Another way is to spread the moist litter onto a flat surface and leave it uncovered for a day or two, in order to promote evaporation of the water. This could be at room temperature, or in a drying chamber at somewhat elevated temperature.

In an alternative embodiment some of the corncob or clumping agent could be replaced with a fragrance material (lavender). This can surprisingly provide a fragrance odor that is appreciable in the final product, notwithstanding the presence of the odor control chemical.

Various portions of corncob are suitable for use, particularly the ring portions. See U.S. Pat. No. 6,635,344. Also, a wide variety of other fragrances and/or deodorizers can instead be used (e.g. pine oil, citrus oil, camphor, essential oils, etc.).

Hence, in order to ascertain the full scope of the invention the preferred embodiments are not to be considered as the only embodiments. Rather, the claims which follow should be referenced as defining the full scope.

INDUSTRIAL APPLICABILITY

The invention provides animal litters where odor control chemicals have been applied to a clumpable litter.

I claim:

1. A method of producing an animal litter, comprising: providing at least 90% of corncob particles by weight; providing at least 0.1% of clumping agent by weight; and providing at least 0.1% of an odor control agent by weight;
   obtaining a water solution of the odor control agent, wherein the odor control agent is soyaethyl morpholinium ethosulfate;
   then spraying the water solution of the odor control agent onto the corncob particles;
   then mixing a result of the spraying with the clumping agent to create a moist litter, wherein the clumping agent is applied at a slow enough rate of application so as to create a moist litter that is, prior to an animal leaving waste on the litter, free of clumps; and
   then permitting at least some water in the moist litter to evaporate from the moist litter while leaving the odor control agent adhering to the corncob particles;
   thereby achieving a well distributed odor control agent without exhausting the function of the clumping agent in the animal litter.

* * * * *